(12) United States Patent
Sandoval et al.

(10) Patent No.: US 9,127,948 B2
(45) Date of Patent: Sep. 8, 2015

(54) PATH DETERMINATION USING ELEVATION DATA

(75) Inventors: Juan E. Sandoval, St. Petersburg, FL (US); Nicholas I. Sapankevych, Clearwater, FL (US); Sara R. Lemley, Clearwater, FL (US)

(73) Assignee: Raytheon Company, Waltham, MA (US)

( * ) Notice: Subject to any disclaimer, the term of this patent is extended or adjusted under 35 U.S.C. 154(b) by 701 days.

(21) Appl. No.: 13/074,366

(22) Filed: Mar. 29, 2011

(65) Prior Publication Data

US 2012/0253664 A1  Oct. 4, 2012

(51) Int. Cl.
  *G05D 1/00* (2006.01)
  *G06F 15/173* (2006.01)
  *G01C 21/20* (2006.01)
  *H04L 12/701* (2013.01)

(52) U.S. Cl.
  CPC ............... *G01C 21/20* (2013.01); *H04L 45/00* (2013.01)

(58) Field of Classification Search
  None
  See application file for complete search history.

(56) References Cited

U.S. PATENT DOCUMENTS

| | | | | |
|---|---|---|---|---|
| 5,916,299 | A * | 6/1999 | Poppen | 701/533 |
| 6,401,038 | B2 * | 6/2002 | Gia | 701/301 |
| 7,440,447 | B2 * | 10/2008 | Kareev et al. | 370/359 |
| 2006/0206623 | A1 * | 9/2006 | Gipps et al. | 709/238 |
| 2010/0324752 | A1 * | 12/2010 | Suganuma et al. | 701/1 |

OTHER PUBLICATIONS

U.S. Appl. No. 61/379,916 entitled "*Open Border CONOPS Analysis*" filed Sep. 3, 2010, inventors Juan E. Sandoval, et al., 30 pages.
U.S. Appl. No. 12/911,948 entitled "*Assigning Sensors to Paths*" filed Oct. 26, 2010, inventors Juan E. Sandoval, et al., 37 pages.

* cited by examiner

*Primary Examiner* — Florian Zeender
*Assistant Examiner* — Denisse Ortiz Roman
(74) *Attorney, Agent, or Firm* — Schwegman Lundberg & Woessner, P.A.

(57) ABSTRACT

In certain embodiments, path determination includes receiving terrain elevation data comprising elevation values for locations of an area, where each elevation value indicates an elevation at a location. One or more gradient matrices are calculated from the elevation values. Each gradient matrix comprises gradient values corresponding to the locations. Traversable segments are determined from the gradient matrices, and a path is determined from the traversable segments.

14 Claims, 8 Drawing Sheets

PATH DETERMINATION USING ELEVATION DATA

BACKGROUND

In certain situations, paths through a geographic area may be determined. For example, paths through a region without manmade roads may be determined. As another example, paths where roads can be constructed may be determined.

SUMMARY OF THE DISCLOSURE

In accordance with the present invention, disadvantages and problems associated with previous techniques for determining paths may be reduced or eliminated.

In certain embodiments, path determination includes receiving terrain elevation data comprising elevation values for locations of an area, where each elevation value indicates an elevation at a location. One or more gradient matrices are calculated from the elevation values. Each gradient matrix comprises gradient values corresponding to the locations. Traversable segments are determined from the gradient matrices, and a path is determined from the traversable segments.

Certain embodiments of the invention may provide one or more technical advantages. A technical advantage of one embodiment may be that elevation data may be used to determine paths through an area. Another technical advantage of one embodiment may be that gradients may be calculated from the elevation data to determine the paths. Another technical advantage of one embodiment may be that gradients in different directions may be calculated.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
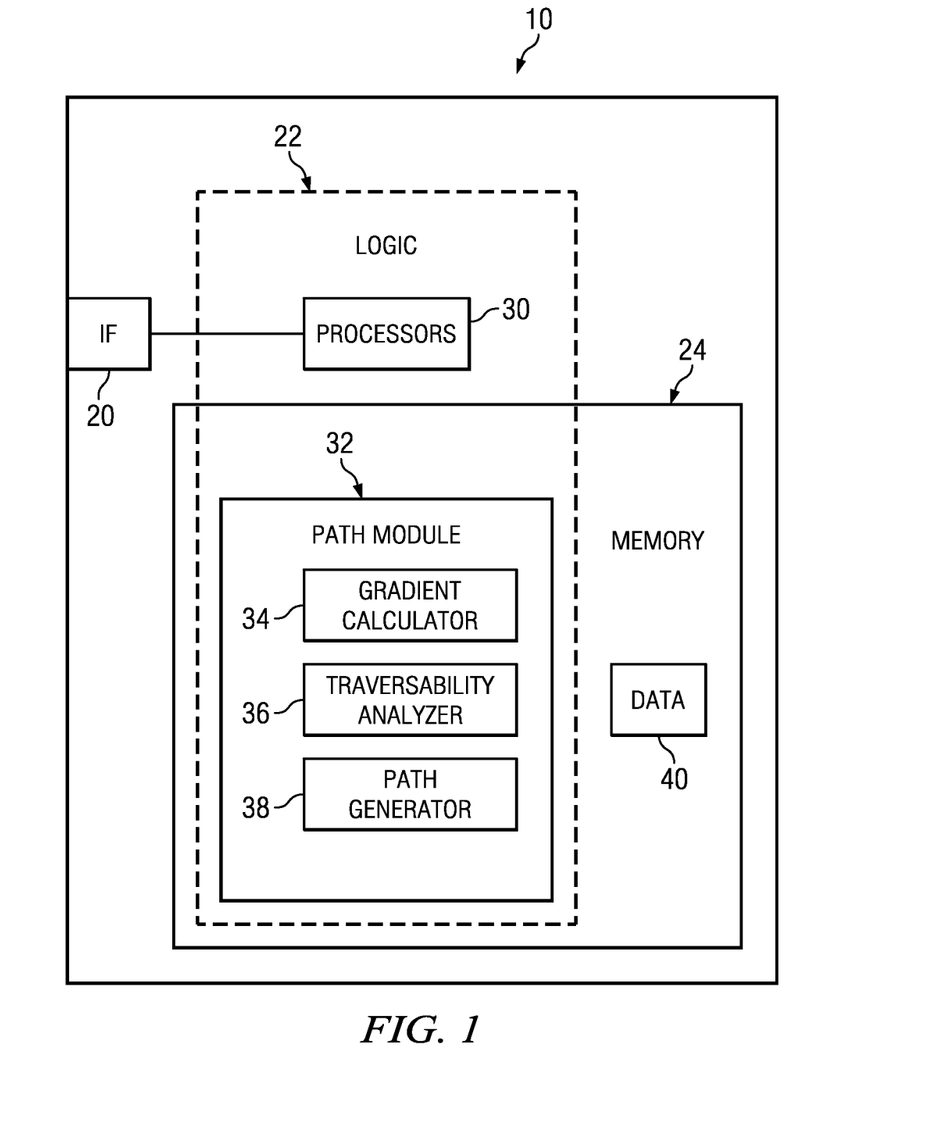
FIG. 1 illustrates an example of a system that may be used to determine paths using elevation data.
Figure 2A:
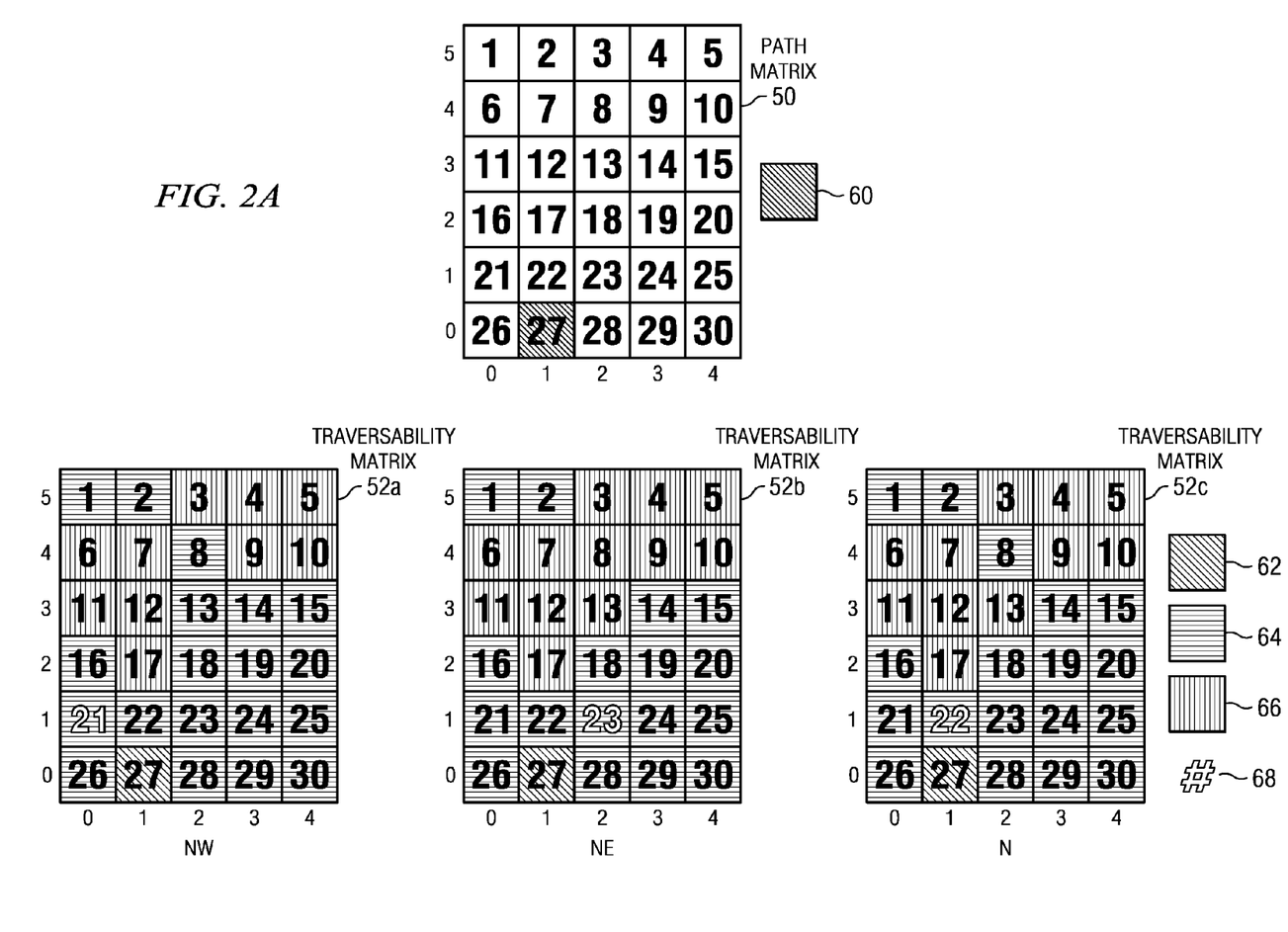
FIGS. 2A through 2F illustrate an example of a method that may be used to generate a path.
Figure 2B:
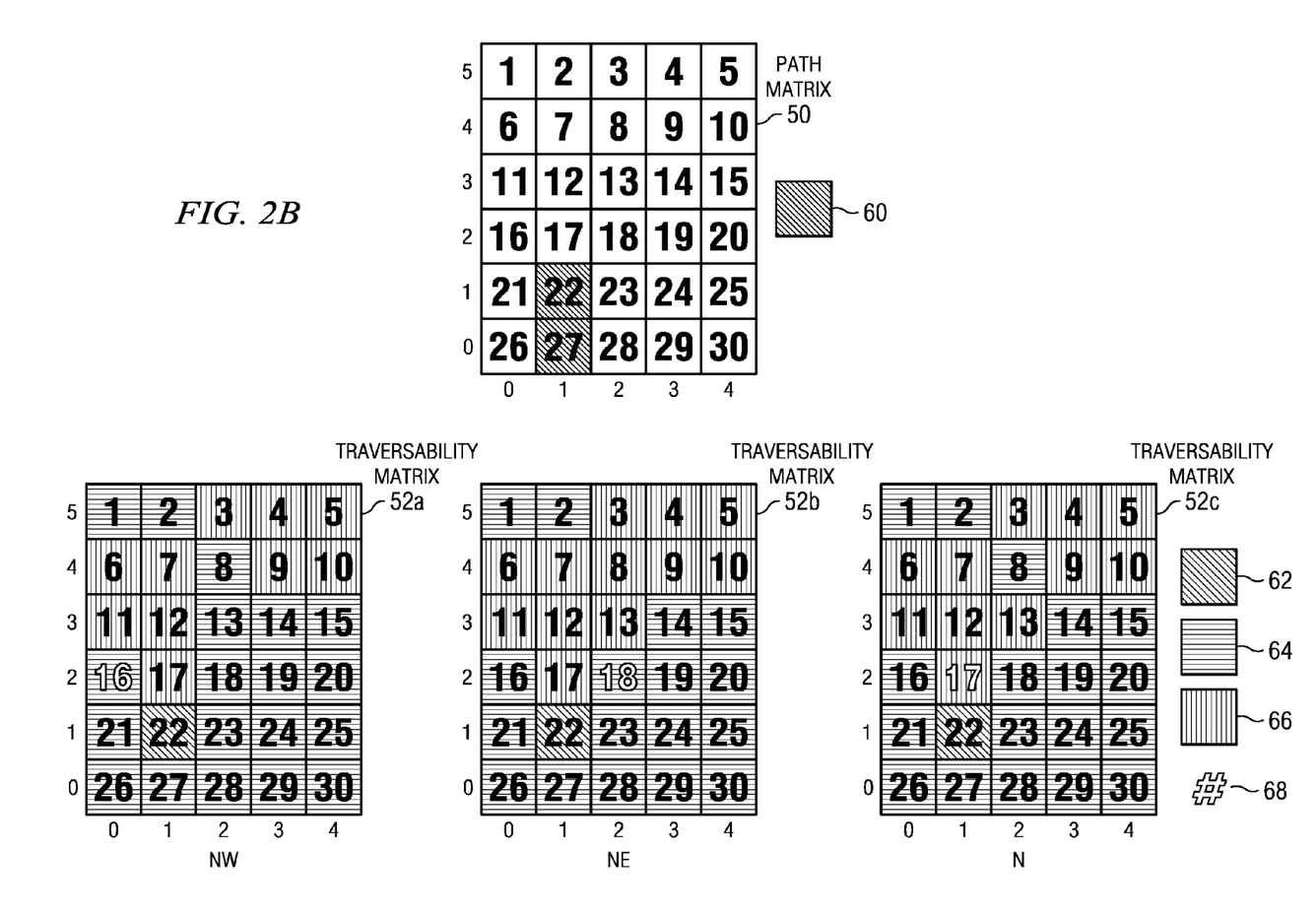
Figure 2C:
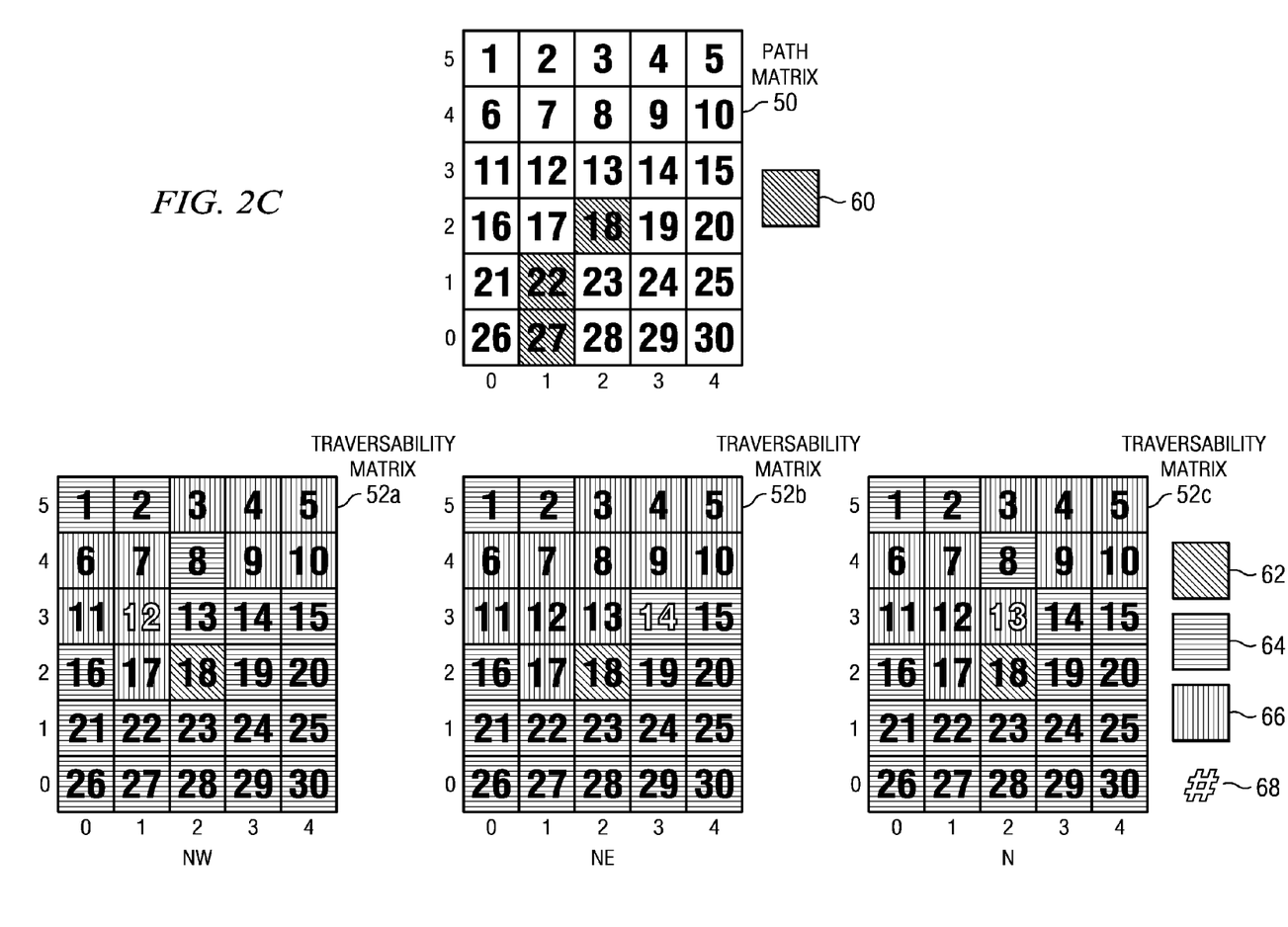
Figure 2D:
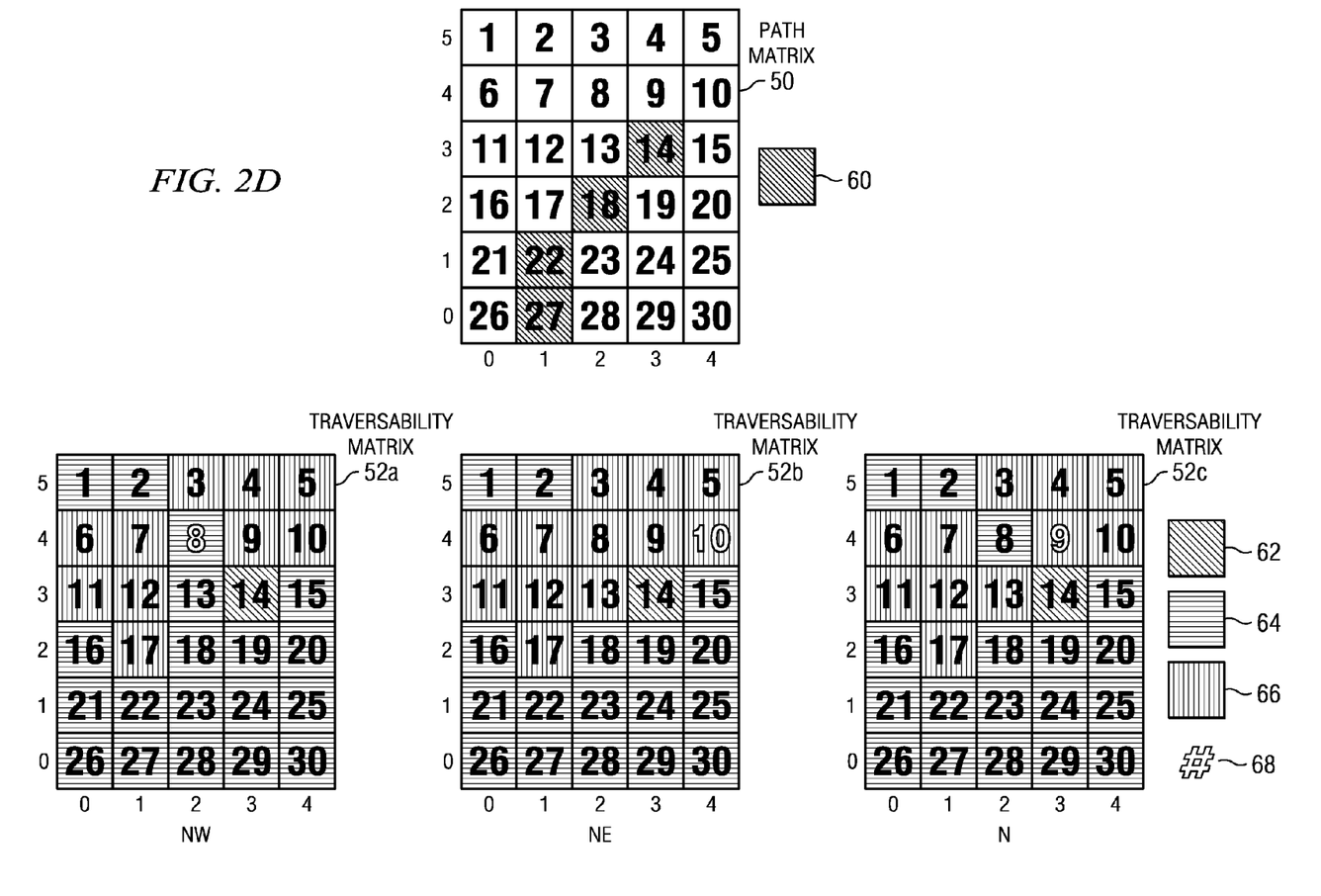
Figure 2E:
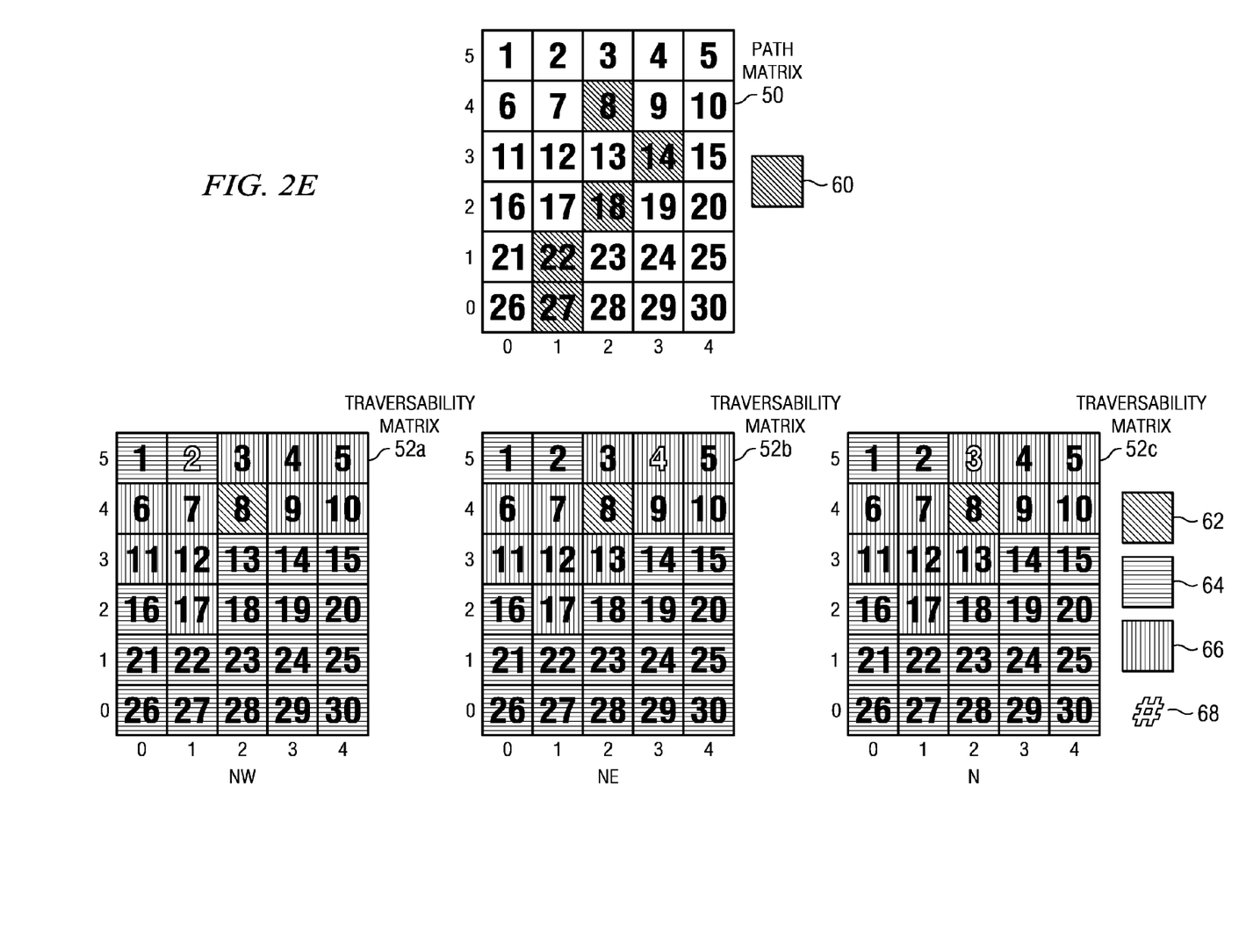
Figure 2F:
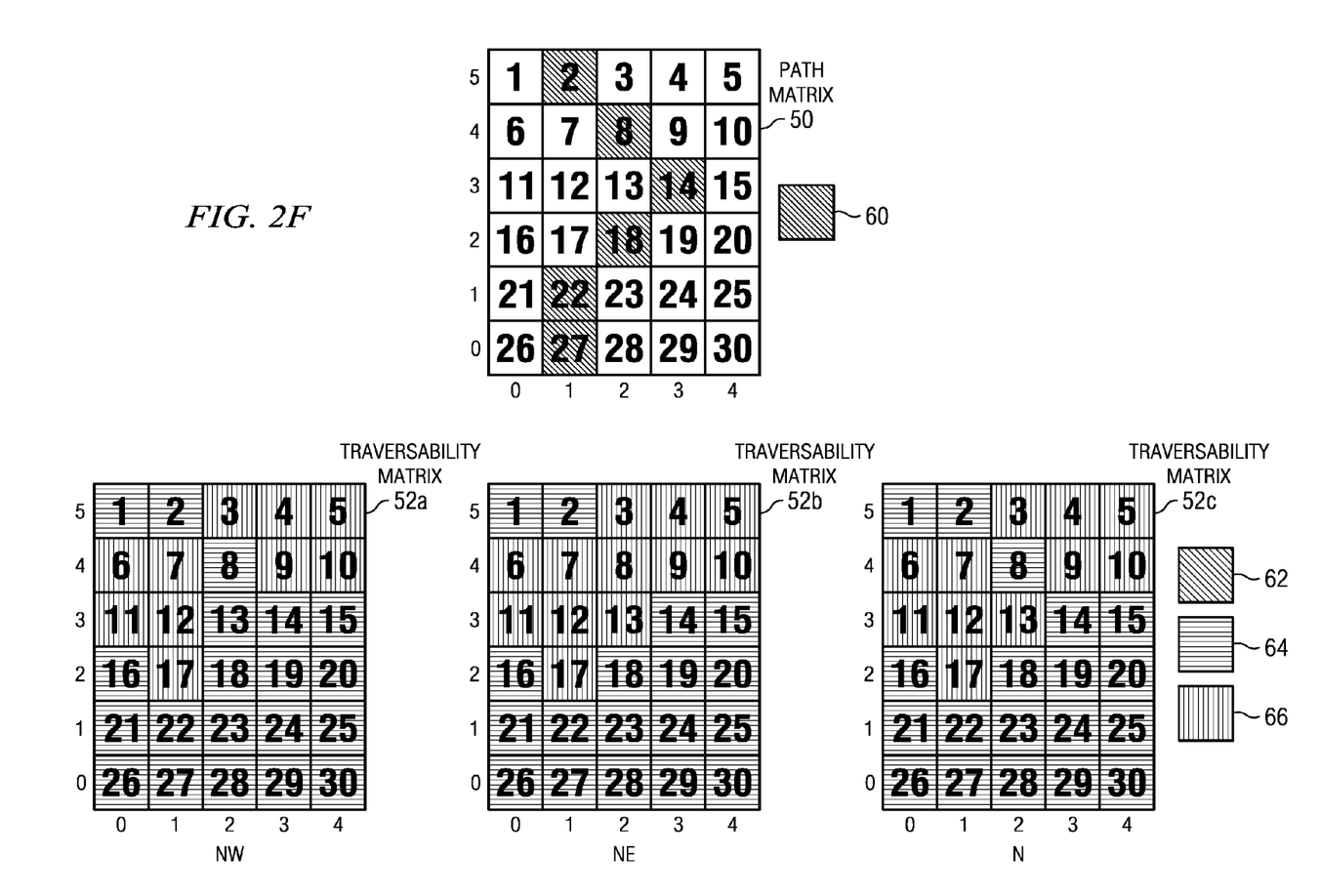
Figure 3:
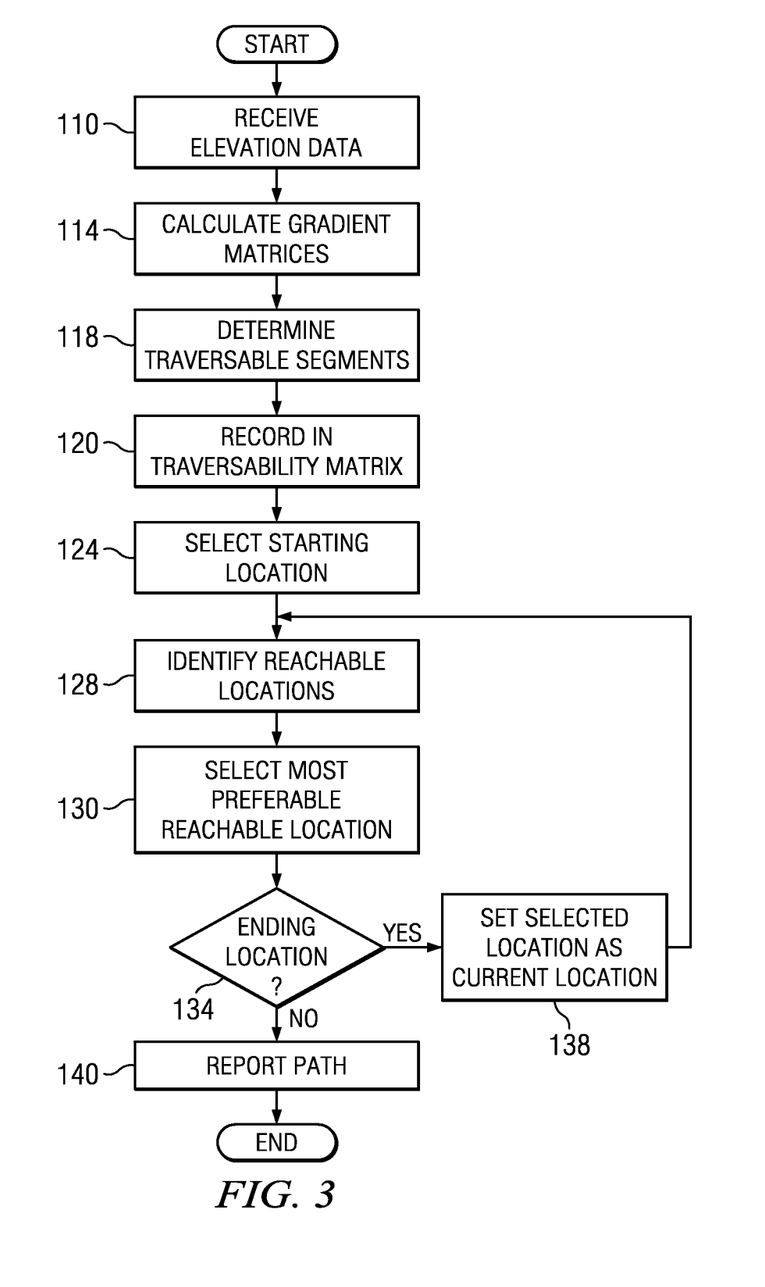
FIG. 3 illustrates an example of a method for determining paths using elevation data.

Embodiments of the present invention and its advantages are best understood by referring to FIGS. 1 through 3 of the drawings, like numerals being used for like and corresponding parts of the various drawings.

FIG. 1 illustrates an example of a system 10 that may be used to determine paths using elevation data. In the illustrated example, system 10 includes one or more interfaces (IF) 20, logic 22, and one or more memories 24. Logic 22 includes one or more processors 30 and a path module 32. Path module 32 includes a gradient calculator 34, a traversability analyzer 36, and a path generator 38. Memory 24 stores path module 32 and terrain elevation data 40.

In certain examples of operation, path module 32 receives terrain elevation data 40 comprising elevation values for locations of an area. Each elevation value indicates an elevation at a location. Path module 32 calculates one or more gradient matrices from the elevation values. Each gradient matrix comprises gradient values corresponding to the locations. Path module 32 determines traversable segments from the gradient matrices and determines a path from the traversable segments.

Terrain elevation data 40 comprises elevation values for locations of an area. The area may be any suitable size or shape and may have any suitable terrain, flora, fauna, or land or water coverage. An elevation value may give the elevation of a geographic location. The elevation of a geographic location is its height above a fixed reference point.

Elevation data 40 may be presented in any suitable manner, such as in any suitable units of length with any suitable granularity. For example, the elevation may be expressed in meters and may be given at intervals, such as an interval with a value in a range of less than 30, 30 to 60, 60 to 90, or greater than 90 meters. Examples of elevation data include the National Elevation Dataset (NED) from the U.S. Geological Survey (USGS), Global 30 Arc Second Elevation Data Set from the USGS, Shuttle Radar Topography Mission data from the National Aeronautics and Space Administration (NASA), ASTER Global Digital Elevation Map (GDEM) from the NASA, and GLOBE Project data from National Oceanic and Atmospheric Administration (NOAA).

The elevation values for locations may be expressed in any suitable manner. In certain embodiments, the locations of an area may be represented using a location matrix. Each entry of the location matrix may represent a particular location of the area. For example, the rows and columns of the matrix may represent coordinate axes for the area. In the example below, location matrix L is a X×Y matrix. Each (x, y) entry of the matrix may represent a (x, y) coordinate of an area. In the example below, the positive y direction may represent North and the positive x direction may represent East.

Location Matrix $L$

| $Y$ | | | | |
|---|---|---|---|---|
| ... | | | | |
| 3 | | | | |
| 2 | | | | |
| 1 | | | | |
| 0 | | | | |
| y/x | 0 | 2 | 3 | ... $X$ |

An elevation matrix may be used to present the elevation values of locations. For example, the elevation corresponding to location (x, y) is placed in entry (x, y) of the elevation matrix. In the illustrated example, the elevation matrix E starts from a 5×5 location matrix and includes the elevation values for the locations.

Elevation Matrix $E$

| 5 | 3 | 10 | 14 | 20 | 23 |
|---|---|---|---|---|---|
| 4 | 7 | 13 | 9 | 14 | 14 |
| 3 | 13 | 18 | 13 | 8 | 8 |
| 2 | 7 | 9 | 7 | 4 | 4 |
| 1 | 3 | 3 | 3 | 2 | 2 |
| 0 | 1 | 1 | 1 | 1 | 1 |
| y/x | 0 | 2 | 3 | 4 | 5 |

Gradient calculator 24 calculates a gradient matrix from elevation values, where a gradient matrix comprises gradient values corresponding to locations. The gradient of a scalar field is a vector field that points in the direction of the greatest rate of increase of the scalar field, whose magnitude is the greatest rate of change. In certain embodiments, the gradient value for a location (x, y) may be placed in entry (x, y) of the gradient matrix. The gradient matrix may be regarded as giving the gradient moving from a current location in the direction given by the gradient matrix.

A gradient matrix may be calculated in any suitable manner. In certain embodiments, a gradient matrix in a particular direction may be calculated. The gradient matrix may be calculated by calculating a gradient for each value in the direction. Any suitable equation may be used to calculate the gradient. For example, the following equation may be used to calculate the gradient in the North (positive y) direction:

$$\arctan\left(\frac{\text{abs}(a_{ij} - a_{i-1j})}{d}\right) * \frac{180}{\pi} * 100$$

where $a_{ij}$ represents the elevation at a location, and d represents the distance between locations of elevations $a_{ij}$ and $a_{i-1j}$. For example, the gradient for (1, 5) of elevation matrix E may be given by:

$$\arctan\left(\frac{\text{abs}(7 - 3)}{10}\right) * \frac{180}{\pi} * 100 = 21.8°$$

Gradient matrix G may be calculated from elevation matrix E. In the example, the gradient value for moving from (x, y) to (x, y+1) is given in entry (x, y+1).

Gradient Matrix G

| | | | | | |
|---|---|---|---|---|---|
| 5 | 21.8° | 16.7° | 42° | 31° | 42° |
| 4 | 31° | 26.6° | 21.8° | 31° | 31° |
| 3 | 31° | 42° | 31° | 21.8° | 21.8° |
| 2 | 21.8° | 31° | 21.8° | 11.3° | 11.3° |
| 1 | 11.3° | 11.3° | 11.3° | 5.7° | 5.7° |
| 0 | — | — | — | — | — |
| Y/X | 0 | 1 | 2 | 3 | 4 |

In certain embodiments, gradient matrices in different directions may be calculated. For example, a first gradient matrix in a first direction and a second gradient matrix in a second direction may be calculated. Gradient matrices in any of the following directions may be calculated, for example, north, east, south, west, northeast, northwest, southeast, and southwest. Any suitable number of matrices in any suitable number of directions may be calculated.

In certain embodiments, gradient matrices in different directions may be combined to yield a combined gradient matrix. For example, each entry of the combined gradient matrix may include an ordered set of values from the individual gradient matrices.

Traversability analyzer determines traversable segments from one or more gradient matrices. A traversable segment may be a segment that is deemed to be acceptable to be selected for a path. For example, such a segment may be a segment that has gradient values less than a maximum gradient value.

Traversable segments may be identified in any suitable manner. In certain embodiments, traversable segments may be identified by identifying gradient values that are less than a maximum gradient value. Segments at the locations of the gradient values may be designated as traversable segments. A maximum gradient value may be selected in any suitable manner. For example, the maximum gradient value may be selected according to the entity for which the path is designed. For example, a maximum gradient value selected for a human may be the maximum gradient that a human can traverse. As another example, a maximum gradient value for a path for a motorized vehicle may be the maximum gradient that the vehicle can traverse.

The traversability matrix indicates the locations that satisfy the maximum gradient value. In the example, traversability matrix T provides the traversability of moving from (x, y) to location (x, y+1) in entry (x, y+1). In the example, "1" represents the segment is traversable, and "0" represents that the segment is not traversable.

Traversability Matrix T

| | | | | | |
|---|---|---|---|---|---|
| 5 | 1 | 1 | 0 | 0 | 0 |
| 4 | 0 | 0 | 1 | 0 | 0 |
| 3 | 0 | 0 | 0 | 1 | 1 |
| 2 | 1 | 0 | 1 | 1 | 1 |
| 1 | 1 | 1 | 1 | 1 | 1 |
| 0 | — | — | — | — | — |
| y/x | 0 | 1 | 2 | 3 | 4 |

Path generator 38 determines a path from traversable segments. The path may be determined in any suitable manner. In certain embodiments, the following may be performed until an ending location has been reached: identifying reachable locations for a current location according to the traversable segments; selecting a most preferable reachable location; and setting the selected location as the next current location.

Path generator 38 may track the reachable locations in any suitable manner, for example, using a list. In certain embodiments, the following may be performed until an ending location has been reached: placing one or more reachable locations for a current location according to the traversable segments in a list in an order of preference; selecting a most preferable reachable location according to the order; setting the selected location as the next current location.

The order of preference may be made in any suitable manner. For example, the most preferable reachable location may be selected according to the order, from most preferable to least preferable: selecting a location in a preferred direction; selecting a location adjacent to the preferred direction; and selecting a location perpendicular to the preferred direction. The preferred direction may be the direction of a goal location. An example of a method that path generator 38 may use to generate paths is described in more detail with reference to FIGS. 2A through 2F.

FIGS. 2A through 2F illustrate an example of a method that may be used to generate a path. In the example, a path matrix 50 records locations that have been selected for the path. In the example, path matrix 50 may be based on location matrix L. In the example, the numerical entries of path matrix 50 are merely identifiers for the location.

Traversability matrices 52 (52a-c) indicate the traversability of the segments in particular directions. Traversability matrix 52a is for Northwest, traversability matrix 52b is for Northeast, and traversability matrix 52c is for North. Boxes 64 indicate traversable segments, and boxes 66 indicate non-traversable segments. Boxes 62 indicate the current location under analysis. One or more segments may start at the current location and end at a segment end location, represented by boxes 68.

In certain embodiments, there may be a set of one or more candidate starting locations and a set of one or more candidate ending locations. In the example, the set of candidate starting locations may include (x, 0), where x=0, 1, . . . , 4, and the set of candidate ending locations may include (x, 5), where x=0, 1, . . . , 4.

FIG. 2A illustrates the starting location 27 (which represents (1, 0)) as the current location. The starting location may be selected in any suitable manner. For example, the starting location may be given or may be selected from a set of candidate starting locations. For example, (1, 0) may be selected from the set of candidate starting locations that includes (x, 0), where x=0, 1, . . . , 4.

Reachable locations of the current location may be determined from the traversable segments. For example, one or more traversable segments may start at the current location and end at a segment end location, which is a reachable location.

Reachable locations of a current location may be placed in an ordered list. The list may be ordered in any suitable manner, for example, the locations at the beginning of the list are less preferable and locations at the end of the list are more preferable. (The order may be reversed in other embodiments.) Preference may be determined in any suitable manner. For example, in order of increasing preference, the order may be: locations in the direction perpendicular to the preferred direction, locations that are adjacent to the preferred direction, and locations in the preferred direction. Any ties in preference may be broken by random selection.

In the example, North is the preferred direction, and Northwest and Northeast are adjacent to the preferred direction. In the example, the reachable locations of current location 27 are 21, 23, and 22, so LIST=[21, 23, 22].

The last element of the order list is the most preferable location. The last element may be selected as the next location of the path and then removed from the list. In the example, location 22 is selected, added to path matrix 50, and removed from LIST. The selected location becomes the current location for the next segment of the path.

FIG. 2B illustrates location 22 as the current location. In the example, reachable locations 16 and 18 are added to LIST to yield LIST=[21, 23, 16, 18]. Location 18 is selected for the path, added to path matrix 50, and removed from LIST. Location 18 becomes the current location for the next segment of the path.

FIG. 2C illustrates location 18 as the current location. In the example, reachable location 14 is added to LIST to yield LIST=[21, 23, 16, 14]. Location 14 is selected for the path, added to path matrix 50, and removed from LIST. Location 14 becomes the current location for the next segment of the path.

FIG. 2D illustrates location 14 as the current location. In the example, reachable location 8 is added to LIST to yield LIST=[21, 23, 16, 8]. Location 8 is selected for the path, added to path matrix 50, and removed from LIST. Location 8 becomes the current location for the next segment of the path.

FIG. 2E illustrates location 8 as the current location. In the example, reachable location 8 is added to LIST to yield LIST=[21, 23, 16, 2]. Location 2 is selected for the path, added to path matrix 50, and removed from LIST. Location 2 is an ending location, so the path is complete. In certain embodiments, path locations (such as path matrix 50) may be reported through an interface 20, such as a graphical user interface (GUI).

FIG. 3 illustrates an example of a method for determining paths using elevation data. The method may be performed by path module 32 of system 10. The method begins at step 110, where path module 32 receives terrain elevation data 40. Gradient calculator 34 calculates gradient matrices at step 114. In certain embodiments, different gradient matrices in different directions may be calculated. Traversable segments may be determined at step 118 by traversability analyzer 136. Traversability analyzer 136 may record the traversable segments in a traversability matrix at step 120.

Steps 124 through 140 may be performed for one or more iterations by path generator 38 in order to generate a path. A starting location is selected at 124. The starting location may be selected from a set of one or more candidate starting locations.

Reachable locations may be identified at step 128. The reachable locations may be determined using the traversability matrix. The most preferable reachable location is selected at step 130. The most preferable location may be selected by placing the reachable locations in a list ordered by preference such that the more preferable items are later in the list, and then selecting the last item of the list. The selected item may be recorded in a path matrix 50.

The selected location may be an ending location at step 134. If the selected location is not the ending location at step 134, the method proceeds to step 138. The selected location is set as the current location at step 138. The method then returns to step 128, where the reachable locations of the current location are identified. If the selected location is the ending location at step 134, the method proceeds to step 140, where the path is reported. The path may be reported using path matrix 50 that records the selected locations.

The method may be used in any suitable situation. For example, the method may be used to determine paths through a territory. The paths may be traversed by any suitable entity or may be used to map out roadways.

In certain embodiments, the method may be used to determine patterns of an image. The data 24 may include intensity values at locations of an image. The gradient values may indicate changes in the intensity values. A minimum gradient value may indicate a minimum change that indicates the presence of a pattern. A path may be used to determine intensity changes that indicate a pattern.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of gradient calculator 34 and traversability analyzer 36 may be performed by one component, or the operations of path generator 38 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method executable by a path module stored in memory comprising:
   receiving terrain elevation data comprising a plurality of elevation values for a plurality of locations of an area without man made roads, each elevation value indicating an elevation at a location;
   calculating one or more gradient matrices from the plurality of elevation values, each gradient matrix comprising a plurality of gradient values corresponding to the plurality of locations, wherein calculating one or more gradient matrices further comprises calculating a gradient matrix in a direction by calculating a gradient for the each elevation value in the direction for each elevation value of at least a subset of the elevation values;
   determining a plurality of traversable segments from the one or more gradient matrices; and
   determining a path from the plurality of traversable segments,
   wherein the determining the plurality of traversable segments comprises:
   identifying one or more gradient values that are less than a maximum gradient traversable by a vehicle for which the path is designated, the one or more gradient values corresponding to one or more locations; and
   designating one or more segments at the one or more locations as traversable segments.

2. The method of claim 1, the calculating one or more gradient matrices further comprising:
   calculating a first gradient matrix in a first direction; and
   calculating a second gradient matrix in a second direction.

3. The method of claim 1, the calculating one or more gradient matrices further comprising:
   calculating a first gradient matrix in a first direction and a second gradient matrix in a second direction; and
   combining the first gradient matrix and the second gradient matrix to yield a combined gradient matrix.

4. The method of claim 1, the determining the path further comprising performing the following until an ending location has been reached:
   identifying one or more reachable locations for a current location according to the traversable segments;
   selecting a most preferable reachable location; and
   setting the selected location as the next current location.

5. The method of claim 1, the determining the path further comprising performing the following until an ending location has been reached:
   placing one or more reachable locations for a current location according to the traversable segments in a list in an order of preference;
   selecting a most preferable reachable location according to the order; and
   setting the selected location as the next current location.

6. The method of claim 1, the determining the path further comprising selecting a most preferable reachable location according to the order:
   selecting a location in a preferred direction;
   selecting a location adjacent to the preferred direction; and
   selecting a location perpendicular to the preferred direction.

7. A system comprising:
   one or more interfaces operable to receive terrain elevation data comprising a plurality of elevation values for a plurality of locations of an area without manmade roads, each elevation value indicating an elevation at a location; and
   one or more processors operable to:
      calculate one or more gradient matrices from the plurality of elevation values, each gradient matrix comprising a plurality of gradient values corresponding to the plurality of locations, wherein the one or more processors operable to calculate one or more gradient matrices is further operable to calculate a gradient matrix in a direction by calculating a gradient for the each elevation value in the direction for each elevation value of at least a subset of the elevation values;
      determine a plurality of traversable segments from the one or more gradient matrices; and
      determine a path from the plurality of traversable segments,
   wherein to determine the plurality of traversable segments, the one or more processors are operable to:
      identify one or more gradient values that are less than a maximum gradient traversable by a vehicle for which the path is designated, the one or more gradient values corresponding to one or more locations; and designate one or more segments at the one or more locations as traversable segments.

8. The system of claim 7, the calculating one or more gradient matrices further comprising:

calculating a first gradient matrix in a first direction; and calculating a second gradient matrix in a second direction.

9. The system of claim 7, the calculating one or more gradient matrices further comprising:

calculating a first gradient matrix in a first direction and a second gradient matrix in a second direction; and combining the first gradient matrix and the second gradient matrix to yield a combined gradient matrix.

10. The system of claim 7, the determining the path further comprising performing the following until an ending location has been reached:

identifying one or more reachable locations for a current location according to the traversable segments;

selecting a most preferable reachable location; and setting the selected location as the next current location.

11. The system of claim 7, the determining the path further comprising performing the following until an ending location has been reached:

placing one or more reachable locations for a current location according to the traversable segments in a list in an order of preference;

selecting a most preferable reachable location according to the order; and setting the selected location as the next current location.

12. The system of claim 7, the determining the path further comprising selecting a most preferable reachable location according to the order:

selecting a location in a preferred direction;

selecting a location adjacent to the preferred direction; and selecting a location perpendicular to the preferred direction.

13. One or more non-transitory computer readable media comprising logic when executed operable to:

receive terrain elevation data comprising a plurality of elevation values for a plurality of locations of an area without man made roads, each elevation value indicating an elevation at a location;

calculate one or more gradient matrices from the plurality of elevation values, each gradient matrix comprising a plurality of gradient values corresponding to the plurality of locations, wherein the one or more non-transitory computer readable media comprising logic when executed operable to calculate one or more gradient matrices is further operable to calculate a gradient matrix in a direction by calculating a gradient for the each elevation value in the direction for each elevation value of at least a subset of the elevation values;

determine a plurality of traversable segments from the one or more gradient matrices; and determine a path from the plurality of traversable segments, wherein to determine the plurality of traversable segments, the logic is to:

identify one or more gradient values that are less than a maximum gradient traversable by a vehicle for which the path is designated, the one or more gradient values corresponding to one or more locations; and designate one or more segments at the one or more locations as traversable segments.

14. The media of claim 13, the determining the path further comprising performing the following until an ending location has been reached:

placing one or more reachable locations for a current location according to the traversable segments in a list in an order of preference;

selecting a most preferable reachable location according to the order; and setting the selected location as the next current location.

* * * * *

UNITED STATES PATENT AND TRADEMARK OFFICE
CERTIFICATE OF CORRECTION

PATENT NO. : 9,127,948 B2  
APPLICATION NO. : 13/074366  
DATED : September 8, 2015  
INVENTOR(S) : Sandoval et al.

Page 1 of 3

It is certified that error appears in the above-identified patent and that said Letters Patent is hereby corrected as shown below:

IN THE SPECIFICATION

In column 2, line 33-45 (Approx), delete "
```
Location Matrix L
Y
...
3
2
1
0
y/x  0  2  3  ...  X
```
" and insert --
```
Location Matrix L
Y
...
3
2
1
0
y/x | 0 | 2 | 3 | ... | X
```
--, therefor In column 2, line 52-65 (Approx), delete "
```
Elevation Matrix E
5   3   10  14  20  23
4   7   13  9   14  14
3   13  18  13  8   8
2   7   9   7   4   4
1   3   3   3   2   2
0   1   1   1   1   1
y/x  0   2   3   4   5
```
" and Signed and Sealed this  
Fifteenth Day of March, 2016

Michelle K. Lee  
*Director of the United States Patent and Trademark Office*

CERTIFICATE OF CORRECTION (continued)  
U.S. Pat. No. 9,127,948 B2 insert --

Elevation Matrix E

| y/x | 0 | 2 | 3 | 4 | 5 |
|---|---|---|---|---|---|
| 5 | 3 | 10 | 14 | 20 | 23 |
| 4 | 7 | 13 | 9 | 14 | 14 |
| 3 | 13 | 18 | 13 | 8 | 6 |
| 2 | 7 | 9 | 7 | 4 | 4 |
| 1 | 3 | 3 | 3 | 2 | 2 |
| 0 | 1 | 1 | 1 | 1 | 1 |

--, therefor

In column 2, line 66, delete "24" and insert --34--, therefor

In column 3, line 35-47 (Approx), delete "

Gradient Matrix G

| | | | | | |
|---|---|---|---|---|---|
| 5 | 21.8° | 16.7° | 42° | 31° | 42° |
| 4 | 31° | 26.6° | 21.8° | 31° | 31° |
| 3 | 31° | 42° | 31° | 21.8° | 21.8° |
| 2 | 21.8° | 31° | 21.8° | 11.3° | 11.3° |
| 1 | 11.3° | 11.3° | 11.3° | 5.7° | 5.7° |
| 0 | — | — | — | — | — |
| Y/X | 0 | 1 | 2 | 3 | 4 |

" and insert --

Gradient Matrix G

| Y/X | 0 | 1 | 2 | 3 | 4 |
|---|---|---|---|---|---|
| 5 | 21.8° | 16.7° | 42° | 31° | 42° |
| 4 | 31° | 26.6° | 21.8° | 31° | 31° |
| 3 | 31° | 42° | 31° | 21.8° | 21.8° |
| 2 | 21.8° | 31° | 21.8° | 11.3° | 11.3° |
| 1 | 11.3° | 11.3° | 11.3° | 5.7° | 5.7° |
| 0 | - | - | - | - | - |

--, therefor

In column 4, line 21-33 (Approx), delete "

Traversability Matrix T

| | | | | | |
|---|---|---|---|---|---|
| 5 | 1 | 1 | 0 | 0 | 0 |
| 4 | 0 | 0 | 1 | 0 | 0 |
| 3 | 0 | 0 | 0 | 1 | 1 |
| 2 | 1 | 0 | 1 | 1 | 1 |
| 1 | 1 | 1 | 1 | 1 | 1 |
| 0 | — | — | — | — | — |
| y/x | 0 | 1 | 2 | 3 | 4 |

" and insert --

| Traversability Matrix T | | | | | |
|---|---|---|---|---|---|
| 5 | 1 | 1 | 0 | 0 | 0 |
| 4 | 0 | 0 | 1 | 0 | 0 |
| 3 | 0 | 0 | 0 | 1 | 1 |
| 2 | 1 | 0 | 1 | 1 | 1 |
| 1 | 1 | 1 | 1 | 1 | 1 |
| 0 | - | - | - | - | - |
| y/x | 0 | 1 | 2 | 3 | 4 |

--, therefor

In column 6, line 11, delete "136." and insert --36.--, therefor

In column 6, line 12, delete "136" and insert --36--, therefor

In column 6, line 41, delete "24" and insert --40--, therefor

IN THE CLAIMS

In column 7, line 56, in Claim 1, delete "man made" and insert --manmade--, therefor In column 10, line 5, in Claim 13, delete "man made" and insert --manmade--, therefor